Figure 1:
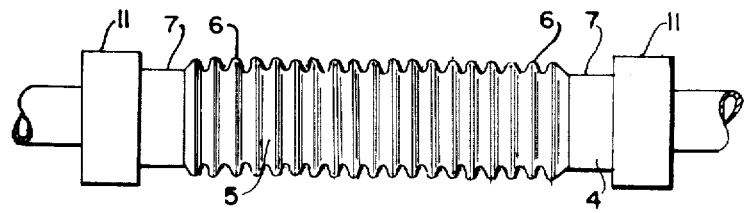

United States Patent
Skoroszewski et al.

[15] 3,697,636
[45] Oct. 10, 1972

[54] PROCESS AND APPARATUS FOR MANUFACTURING FIBERS OR YARNS FROM MOLECULARLY ORIENTABLE ORGANIC POLYMERIC FILMS

[72] Inventors: Wladyslaw H. Skoroszewski, Manchester; Dennis S. Stones, Bolton, both of England

[73] Assignee: Shell Oil Company, New York, N.Y.

[22] Filed: June 22, 1970

[21] Appl. No.: 48,232

[30] Foreign Application Priority Data

June 26, 1969 Great Britain..........32,364/69

[52] U.S. Cl. ..................264/147, 18/10, 161/168, 225/3, 225/97, 264/DIG. 8, 264/DIG. 47
[51] Int. Cl. ..............................................B29d 7/20
[58] Field of Search..264/147, DIG. 8, DIG. 47, 321; 83/6, 7, 11, 12; 18/9, 10, 11; 225/3, 97

[56] References Cited

UNITED STATES PATENTS

| | | | |
|---|---|---|---|
| 2,728,950 | 1/1956 | Annesser | 264/DIG. 47 |
| 3,257,488 | 6/1966 | Rasmussen | 264/DIG. 8 |
| 3,488,415 | 1/1970 | Patchell et al. | 263/DIG. 47 |
| 1,646,918 | 10/1927 | Lenston | 83/12 |
| 2,242,514 | 5/1941 | De Smith | 83/12 |
| 1,750,718 | 3/1930 | Lenston | 83/12 X |
| 2,311,698 | 2/1943 | Saubestre | 83/12 |
| 3,009,848 | 11/1961 | Simon | 18/10 X |
| 3,359,773 | 12/1967 | Stuchbery | 83/7 X |
| 3,494,522 | 2/1970 | Kim et al. | 264/DIG. 47 |

FOREIGN PATENTS OR APPLICATIONS

| | | | |
|---|---|---|---|
| 265,985 | 3/1966 | Australia | 264/147 |
| 1,025,112 | 2/1958 | Germany | 83/6 |

*Primary Examiner*—Philip E. Anderson
*Attorney*—Martin S. Baer and Norris E. Faringer

[57] ABSTRACT

An improved process for the production of fibers or yarns of molecularly orientable organic polymer in which a polymer web is grooved by a rigid profiling element, the resulting profiled web being subsequently stretched and split into individual fibers, characterized that the profiling element forms an edge bead in the web of width sufficient to prevent a groove formed in the profiled web from running into an edge as a result of any lateral movement of said web.

9 Claims, 4 Drawing Figures

PATENTED OCT 10 1972  3,697,636

INVENTORS:
WLADYSLAW H. SKOROSZEWSKI
DENNIS S. STONES
BY:
Martin S. Baer
THEIR ATTORNEY

PROCESS AND APPARATUS FOR MANUFACTURING FIBERS OR YARNS FROM MOLECULARLY ORIENTABLE ORGANIC POLYMERIC FILMS

The present invention is concerned with manufacture of synthetic fibers and yarns, and with machinery for the manufacture of such synthetic fibers. By the term "synthetic fibers" is meant fibers formed from molecularly-orientable organic polymers, particularly polyolefins and olefin copolymers, for example, high density polyethylene and polypropylene.

It is known that molecularly-orientable organic polymers in the form of films which have been uniaxially oriented by stretching can undergo fibrillating fracture (herein referred to as fibrillation) along cleavage lines running in the direction of orientation, but spaced apart in a generally random fashion in the direction at right angles thereto. Fibrillation can be induced by subjecting the uniaxially oriented film to mechanical treatment, for example, brushing or air blast treatment; such treatment is referred to herein as "fibrillation treatment." If necessary the film can be slit or scored in the direction of orientation prior to said mechanical treatment with a view to promoting fibrillation and of reducing the degree of randomness in the spacing apart of said cleavage lines. However, although the general concept of fibrillation has been known for many years, considerable effort has been devoted, and continues to be devoted, by those in the art to the many problems which arise when applying this concept to the manufacture of "fine fibers," i.e., fibers of extremely small cross-section, for example, 5 to 90 denier fibers from molecularly-orientable organic polymers. In order to compete with fibers produced by the conventional "-spinneret method," the manufacture of fibers by fibrillation must be capable of yielding fibers of acceptable and consistent quality at comparable or lower cost and by reliable and practical techniques.

Co-pending and co-assigned Pat. application of B.J. Vernon and W.H. Skoroszewski Ser. No. 814,579 filed Apr. 9, 1969, and now abandoned is concerned, inter alia, with the manufacture of synthetic fibers by a process which comprises profiling a web of a molecularly-orientable organic polymer by impressing into a surface thereof a plurality of longitudinally extending grooves disposed in close but spaced apart relationship, stretching web to a fibrillation treatment, said grooves being formed by passing said web at a temperature below the crystalline melting point of the polymer through the nip formed between two counter-rotating rollers or the like having non-yielding surfaces, at least one of the said rollers or the like having a plurality of closely-spaced, parallel surface ridges each having inwardly directed sides leading to peaks which are rounded off to a small radius. Co-pending and co-assigned Pat. application of B.J. Vernon and W.H. Skoroszewski Ser. No. 814,768 filed Apr. 9, 1969, is also concerned, inter alia, with a process for the manufacture of synthetic fibers by bringing a sheet-like mass of a molecularly-orientable organic polymer at a temperature above its crystalline melting point into pressure contact with a profiling element to from a profiled polymer web having a plurality of longitudinal grooves disposed in close but spaced apart relationship in at least one surface thereof, said profiling element having a plurality of closely-spaced, parallel, surface ridges each having inwardly directed sides leading to a peak, chilling the profiled web during and/or after contact with said profiling element to a temperature below the crystalline melting point of a polymer, stretching the chilled, profiled web to effect orientation thereof, the chilled web being subjected during and/or after stretching to conditions resulting in a controlled fibrillation thereof, to form the required synthetic fibers.

The use of a profiling element having a plurality of closely-spaced, parallel surface ridges each having inwardly directed sides leading to a peak is a feature common to both these processes. In the aforesaid Pat. application Ser. No. 814,579, the profiling element is a roller or the like having peaks to the parallel surface ridges which are rounded off to a small radius.

The present invention is concerned with a process for the manufacture of synthetic fibers (hereinafter referred to as "a process of the kind defined") in which such a profiling element is used to form a profiled polymer web from a sheet-like mass of a molecularly-orientable organic polymer at a temperature above its crystalline melting point or from a web of such a polymer at a temperature below its crystalline melting point, the resulting profiled web being split subsequently into individual fibers.

A problem which can arise in the operation of such a process is that said mass or web of polymer can move laterally with respect to the profiling element. Consequently, if the width of the ridged portion thereof is equal to the width of the mass or web of polymer which is brought into contact therewith, any such lateral movement as may occur during normal operation of the process will result in one or more of the grooves formed in the mass or web of polymer running into an edge thereof giving rise to filament breakage during the conversion of the resulting grooved web into individual fibers. As will be appreciated, this is considerably descriptive fiber manufacturing of the process. The same problem can also arise as a result of minor variations in the width of the polymer mass which can occur during continuous extrusion; such variations can, of course, occur despite careful control or regulation of the extrusion operation, and is independent of the lateral movement effect referred to above.

According to the invention there is provided an improved process for the manufacture of synthetic fibers from a molecularly-orientable organic polymer in which a profiled polymer web is formed by a profiling element, the resulting profiled web being subsequently split into individual fibers, the improvement comprising:

Employing an improved profiling element, said profiling element being disposed to profile one surface of an unprofiled polymer web, said profiling element having a ridged portion in the form of a band bounded on each longitudinal edge by a ridge and immediately beyond said ridge, by a trough-like depression of a width sufficient to prevent a groove formed in the web of polymer from running into an edge thereof as the result any lateral movement; and After profiling, removing the ungrooved edge portion of the polymer web.

The present invention also includes synthetic fibers manufactured by the process just defined, such fibers including staple fibers and yarns, and textile goods, ropes and other cordage made therefrom.

A further advantage of the present invention as just defined is that the formation of an edge "bead" in a sheet-like mass of polymer at a temperature above the crystalline melting point thereof after extrusion but prior to contacting said profiling element may be rendered less of an operational problem. Such edge beads, i.e., narrow, raised edge portions running the length of the continuously extruded mass on each side thereof which are formed as a result of draw-down in the melt, give rise to a pressure loss over the center portion of the mass when in contact with the profiling element and this gives rise to operational difficulties therewith. In carrying out the present invention in the form defined above, the ungrooved edge portions of the profiled web may be trimmed off without difficulty using a simple trimming operation and the beads are removed in the trimming. The latter may be effected with blunt knives or even pegs since the profiled web shows a ready tendency to split. The width of the trough-like depressions on the profiling element can be such as to provide edge portions having width of, e.g., from about ½ to about 2 inches which can readily be removed. The depth of the trough-like depression may be equal to the depth of the troughs between adjacent ridges of the profiling element. Beyond each trough the surface of the profiling element preferably rises very slightly higher than the height of the ridges to form a shoulder preventing damage thereto. Preferably, the depth of said depression is not so great that no contact occurs between the polymer and the bottom of the depression.

According to a further aspect of the present invention a process for the manufacture of synthetic fibers from a molecularly-orientable organic polymer is provided, wherein the ridged portion of the profiling element comprises ridges of unequal pitch such that the ultimate grooved web breaks down into a plurality of fibers of at least two different denier.

The grooved web may, for example, break down under fibrillation treatment into fibers, the major number of which are of one denier and a minor number of which are of larger denier. As a result textile goods and other products made from a plurality of fibers of this kind can have the advantage of a desirable feel or handle and a desirable appearance resulting from the presence of the low denier fibers coupled with the strength properties resulting from the reinforcing effect of the high denier fibers. This aspect of the present invention may be of particular interest for the manufacture of fibers intended for use as such rather than as staple fibers in the manufacture of textile goods, the term "textile goods" being used herein in its broadest sense.

The present invention also includes apparatus suitable for use in carrying out a process of the invention, which comprises a profiling element in the form of a band bounded on each longitudinal edge by a ridge and, immediately beyond said ridge, by a trough-like depression. In such a profiling element, the ridged portion may comprise ridges of unequal pitch.

The present invention is particularly applicable to the inventions described in co-pending Pat. applications Ser. Nos. 814,768, 814,579 and the Pat. application Ser. No. 48,231 of W.H. Skoroszewski filed June 22, 1970 based upon U.K. Pat. application No. 32365/69. Reference is made to these specifications for details of the inventions forming the subject thereof, and, insofar as the matter of these other inventions is concerned, the present invention may be carried out in the manner described in any of these applications.

In the process according to the invention any thermoplastic material may be used which in the form of a web acquires molecular orientation by stretching, for example homo- and copolymers of vinyl chloride, vinylidene chloride, vinyl acetate, acrylonitrile, polyesters and polyamides. Preferred starting materials are homo- and copolymers of lactones, in particular polypivalolactone, and homo- and copolymers of monoolefins such as ethylene and propylene, and especially low-pressure polyethylene and polypropylene, or other polymers of alpha-monoolefins, especially of $C_2$ to $C_8$ monoolefins, which are at least about 50 percent crystalline, including so-called high density polyethylene and steroregular polypropylene.

In accordance with the present invention, fine fibers can be manufactured from molecularly-orientable organic polymers, for example, polyolefins and olefin copolymers (the term "polymer" including a polymer composition) by the controlled fibrillation of a film thereof which has been profiled in cross-section in the manner described herein. The profiling is such as to provide longitudinally extending portions of the film, which are the precursors of the required fibers, spaced apart by longitudinally extending portions of lesser thickness, which are the precursors of predetermined cleavage paths along which fibrillation will occur. The term "controlled fibrillation" is used to indicate a fibrillating fracture (the description fibrillating fracture including what can be referred to as "spontaneous splitting") along such predetermined cleavage paths to give sharply defined fibers substantially free from "whiskery" appendant fibrils; the term is used herein to provide a contrast with random fibrillation occurring in a longitudinal direction but not along predetermined cleavage paths since in the latter case such fibrils tend to be formed even when the film is scored or cut prior to fibrillation. The present invention is of a particular interest for the manufacture of fine polypropylene fibers for the textile industry, such as, for example, for carpet manufacture, and the like.

The manufacture of fibers is carried out in two successive stages, namely web-profiling, and stretching and fibrillation. In the first stage, a slot die extruder provides a web of molecularly-orientable organic polymer at a temperature above its crystalline melting point which web is fed between the nip formed between a roller having closely-spaced, parallel surface ridges and a smooth-surfaced backing roller. Both rollers are of non-yielding surfaces, e.g., steel so as to provide for impressing the desired grooves into the surface of the web without cutting through the web, such being avoided by careful positioning of the backing roller with respect to the ridged roller. The resulting grooved web passes over an idler roller to the first roll of a standard Godet unit which in operation provides the necessary tension in the web to pull it though the nip between the rollers. The web is pulled from the first Godet unit through a standard heating oven by a second Godet unit which runs at a higher speed than the first so as to stretch the web. Typical stretch ratios employed for polypropylene, e.g., are between 5:1 and 12:1 and more; the oven can be operated at a temperature in the range from about 120°–150° C, preferably 140°–150° C. Such stretching effects molecular orientation of the web and also results in an appreciable draw-down of its cross-section to an extent depending on the draw-down ratio employed; surprisingly, in most instances controlled fibrillation of the draw-down web occurs during the mechanical handling which occurs during its passage through the second Godet unit; in fact such fibrillation can start within the oven in which stretching is taking place. In this way a spontaneous and complete division of the web into individual fibers, each of draw-down cross-section corresponding to that of the "humps" of the impressed web, occurs. However, if a complete division is not achieved in this way the stretched web is passed through an aspirator, which can be a standard form of "waste collector," in which fibrillation takes place or is completed. In either case, the resulting yarn of individual fibers is reeled-up on the spool. The degree of "splitability" of a particular profiled web can be gauged by rubbing the web between the fingers.

The ridge profile of the roller which can be employed as the profiling element in carrying out the present invention as just described has peaks, the tips of which are only slightly radiused, the dimensions of the peaks being such that while providing for adequate strength, they result in the minimum "land" between adjacent "humps" of the grooved web, which land constitutes the precursor of the predetermined longitudinal path along with the grooved web will split during the subsequent controlled fibrillation. Although the troughs formed between adjacent ridges are shown as having concavely-shaped bottoms in the accompanying drawing, this is not essential and a measure of flattening can be present; in fact troughs having flat bottoms are not excluded, although in such case the lines of juncture between the bottoms and respective sides of the ridges are preferably rounded-off to avoid sharp angles. The thickness of the web in this land portion can be of the order of, for example, 1/10 to 1/20 of that of the web before grooving, and the depth of the grooves in the ridged roller should be such that the material of the web flows into and tends to fill the troughs of the ridged roller during the grooving operation, although such filling is not necessarily complete. In general, the denier of the resulting fibers will be determined by the size of the humps of the web and the degree of draw-down which takes place during stretching; both can be varied within sufficiently wide limits to enable fibers of an adequately wide range of denier to be manufactured by the present process, but of course the additional flexibility introduced by employing the invention forming the subject of co-assigned Pat. application Ser. No. 48,231 of W.H. Skoroszewski filed June 22, 1970 based upon U.K. Pat. application No. 32365/69, i.e., in which the profiled web before being chilled to a temperature below the crystalline melting point of the polymer is subjected to "draw-down," can also be employed in carrying out the present invention.

The present invention may be illustrated with reference to the accompanying drawing which shows in FIG. 1 a profiling element in the form of a ridged roll embodying trough-like depressions on each side of its ridged portions, in FIG. 2 a portion of the roll of FIG. 1 on an enlarged scale, and in FIG. 3 a portion of a profiling element in the form of a ridged roll embodying ridges of different pitch. FIG. 4 exaggerates differences in pitch of the ridges.

Figure 2:
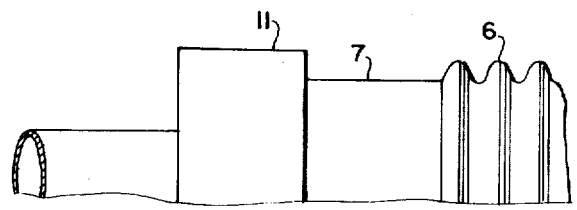

Referring to FIG. 1 and 2 a ridged roll 4 has ridge portion in the form of a band 5 bounded at each longitudinal edge by a ridge 6, a trough-like depression 7 of a rectangular section and a shoulder 11. The width of the depression 7 may be of the order of, for example, one inch and its depth may be equal to the depth of the troughs between adjacent ridges.

Figure 3:
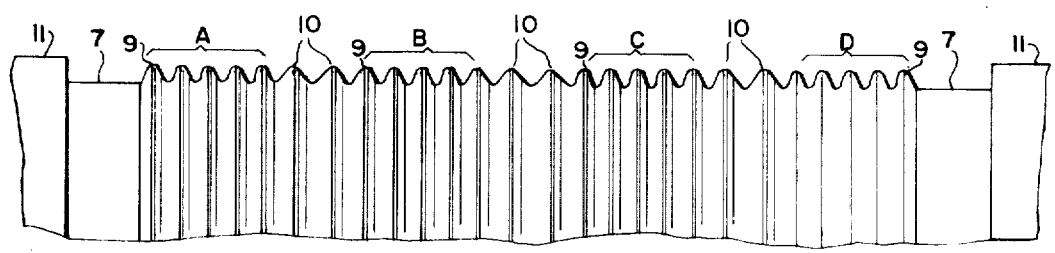
Figure 4:
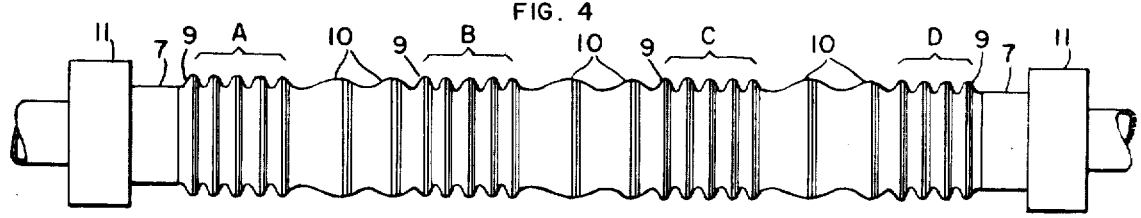

Referring to FIGS. 3 and 4, the ridged roll embodies a ridged portion which has ridges 9 of small pitch, for example, 40 TPI (threads per inch) Standard Whitworth form, the ridges having a pitch of 0.0125 inch, a depth of 0.0077 inch and an inclusive angle of 55°, arranged in sections A,B,C,D, separated by a small number of ridges 10 of greater pitch, these ridges having a pitch of 0.020 inch, a depth of 0.0077 inch. The ratio of the number of ridges of small pitch to the number of ridges of greater pitch may be selected in accordance with end use requirements, in particular the number of reinforcing fibers of small denier required in textile goods to be made from the produce fibers.

The present invention is illustrated by the following example:

EXAMPLE

Polypropylene fibers of an average denier of 30 were made from polypropylene of melt index 3.5 using apparatus comprising a profiling unit as just described with reference to FIGS. 1 and II of the accompanying drawings and conventional stretching equipment (not shown). The profiling roll comprised ridges in the form of a band four inches wide bounded on each longitudinal edge by a trough-like depression one inch wide and of depth equal to the depth of the troughs between adjacent ridges. Slightly raised portions (11 in the accompanying drawings) were provided on each side of the profiled band to prevent damage to the profile.

A hot web of polypropylene 6.5 inches wide and 0.003 inch thick was extruded from a 2-inch extruder located above the profiling unit, the hot extruded web falling vertically down into the nip between the ridged roller and the backing roller at a speed of 30 feet per minute. Cooling water was circulated through the ridged roll to maintain it at 15° C during operation, but the backing roller was allowed to run at a higher temperature, namely 90° C. The contact pressure exerted on the web as it passed between the roller was about 1000 p.s.i. The resulting profiled web leaving the rollers was subjected to a simple slitting operation to remove ungrooved side portions and was passed to the first Godet set of the stretching unit. The latter was operated with a stretch ratio of 8:1 and at an oven (i.e. stretching) temperature of 145° C. The stretched web was taken off at a speed of 240 feet per minute and a complete breakdown into individual filaments had occurred as a result of a controlled fibrillation of the web by the time it left the second Godet set. No "bead" problem arose during operation and the groove "wander" which occurred in the profiled web during operation was wholly contained within the ungrooved side portions of the web.

The manufacture of fibers of mixed denier in accordance with the present invention can also be carried out in the manner just described except, that a profiling roll of appropriate ridge size and pitch, for example as shown in FIG. 3 of the accompanying drawing, is employed.

We claim as our invention:

1. In a process for the manufacture of synthetic fibers, from a molecularly-orientable organic polymer in which a profiled polymer web is formed by a profiling element, the resulting profiled web being split subsequently into individual fibers, the improvement comprising;

employing an improved profiling element, said profiling element being disposed to profile one surface of an unprofiled polymer web, said profiling element being a roller and having a ridged portion in the form of a band bounded on each longitudinal edge by a ridge and immediately beyond said ridge, by a trough-like depression of a width sufficient to prevent a groove formed in the web of a polymer from running into an edge thereof as the result any lateral movement; and after profiling, removing the ungrooved edge portion of the polymer web.

2. A process as in claim 1 in which the ridged portion of the profiling element comprises ridges of unequal pitch such that the ultimate grooved web breaks down into a plurality of fibers of at least two substantially different denier.

3. A process as in claim 1 in which the width of the trough-like depressions on the profiling element is from about ½ to about 2 inches.

4. A process as in claim 1 in which the depth of the trough-like depression is equal to the depth of the troughs between adjacent ridges of the profiling element.

5. A process as in claim 1 in which beyond each trough the surface of the profiling element rises very slightly higher than the height of the ridges to form a shoulder.

6. A process as in claim 2 in which the ridged roll embodies a ridged portion which has ridges of small pitch separated by a small number of ridges of greater pitch.

7. A process as in claim 1 wherein said molecularly orientable organic polymer is polypropylene or high density polyethylene.

8. In apparatus suitable for use in the manufacture of synthetic fibers which comprises a web profiling element, means for stretching a profiled polymer web from said profiling unit and subjecting a stretched web to a fibrillation treatment, the improvement comprising:

an improved profiling element which is disposed to profile one surface of an unprofiled polymer web, said profiling element being a roller and having a ridged portion in the form of a band bounded on each longitudinal edge by a ridge and immediately beyond said ridge, by a trough-like depression of a width sufficient to prevent a groove formed in the web of polymer from running into an edge thereof as the result any lateral movement.

9. Apparatus as in claim 8 in which the ridged portion of the profiling element comprises ridges of unequal pitch such that the ultimate grooved web breaks down into a plurality of fibers of at least two different denier.

* * * * *